United States Patent
Guan et al.

(10) Patent No.: US 11,551,385 B1
(45) Date of Patent: Jan. 10, 2023

(54) TEXTURE REPLACEMENT SYSTEM IN A MULTIMEDIA

(71) Applicant: Black Sesame International Holding Limited, San Jose, CA (US)

(72) Inventors: Xibeijia Guan, Singapore (SG); Tiecheng Wu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/356,227

(22) Filed: Jun. 23, 2021

(51) Int. Cl.
*G06T 11/00* (2006.01)
*G06T 7/11* (2017.01)
(Continued)

(52) U.S. Cl.
CPC .............. *G06T 11/001* (2013.01); *G06T 7/11* (2017.01); *G06T 7/194* (2017.01); *G06T 7/40* (2013.01);
(Continued)

(58) Field of Classification Search
CPC . G06T 11/001; G06T 7/11; G06T 7/40; G06T 7/194; G06T 2207/10016; G06T 2207/10024; G06T 13/00; G06T 15/04; G06T 11/40; G09G 5/02; G09G 5/024; G09G 2340/02; G09G 2340/04; G09G 2340/10; G09G 5/206; G09G 5/377; G09G 2320/02; G09G 2320/0238; G09G 2320/0242; G09G 2320/0271; G09G 2320/0276; G09G 2320/06; G09G 2320/0606; G09G 2320/066; H04N 1/60; H04N 5/445; H04N 19/00; H04N 19/44; H04N 1/6027; H04N 1/6041; H04N 1/6058; H04N 1/6075; H04N 1/6077; H04N 5/145; H04N 5/147; H04N 5/20; H04N 5/202; H04N 5/21; H04N 5/23216; H04N 5/23251; H04N 5/23264; H04N 5/232933; H04N 13/15; H04N 13/156; H04N 13/183; H04N 13/19; G06F 3/408; G06F 3/0484; G06F 3/0482
(Continued)

(56) References Cited

U.S. PATENT DOCUMENTS 7,309,639 B1    12/2007  Hopper et al.
8,073,243 B2 *  12/2011  Mareachen ............ H04N 7/147
                                                    382/173
(Continued)

FOREIGN PATENT DOCUMENTS

CN    102568002 B  *  7/2014  ............... G06T 7/90
CN    104364825 A  *  2/2015  ............... G06T 11/60

*Primary Examiner* — Wesner Sajous
(74) *Attorney, Agent, or Firm* — Timothy T. Wang; Ni, Wang & Massand, PLLC

(57) ABSTRACT

The present invention discloses system and method for replacing a texture of a background region in a multimedia. The system is an AI-based multi-media processing system for replacing the original texture of the background of the multimedia with a texture template. The system applies a foreground mask to hide and protect the foreground region and multiple textures of the background. The system uses deep learning to segment specific texture from images or video sequences. The system replaces the texture of the original input image with a texture template to form a processed image.

19 Claims, 6 Drawing Sheets

(51) Int. Cl.
*G06T 7/40* (2017.01)
*H04N 1/60* (2006.01)
*H04N 9/76* (2006.01)
*H04N 13/15* (2018.01)
*G06T 7/194* (2017.01)

(52) U.S. Cl.
CPC ............... *G06T 2207/10016* (2013.01); *G06T 2207/10024* (2013.01)

(58) Field of Classification Search
USPC ........................................................ 345/582
See application file for complete search history.

(56) References Cited

U.S. PATENT DOCUMENTS

| | | |
|---|---|---|
| 8,503,767 B2 | 8/2013 | Sun et al. |
| 9,503,685 B2 | 11/2016 | Baron, Jr. et al. |
| 10,282,866 B2 * | 5/2019 | Dumitras ............. H04N 19/167 |
| 2005/0169537 A1 * | 8/2005 | Keramane .............. H04N 19/17 |
| | | 375/E7.176 |
| 2016/0080662 A1 * | 3/2016 | Saban ........................ G06T 7/11 |
| | | 348/77 |

* cited by examiner

TEXTURE REPLACEMENT SYSTEM IN A MULTIMEDIA

FIELD OF INVENTION

The present invention generally relates to systems and methods for replacing a texture in the background of a multimedia. The system applies a foreground mask to hide and protect the foreground region and multiple textures of the background. More specifically, the present invention is directed to art AI-based multi-media processing system for replacing the original texture in the background of the multimedia with a template texture.

BACKGROUND OF THE INVENTION

The goal of texture replacement is to replace some specified texture patterns without changing original lighting, shadows and occlusions in a multimedia such as an image, an animation or a video. Traditionally, all methods are to related classifications based on color constancy, markov random field, and so on. All these methods consider the relationship between pixels but do not consider the semantic information of pixels which leads to inaccurate segmentation results. For example, if a foreground object contains a similar color of background texture, the color classification methods will classify a part of foreground as background texture. This leads to an imperfect or inaccurate multimedia as an outcome.

An issued U.S. Pat. No. 7,309,639 assigned to National Semiconductor Corp. discloses a technology related to ROI selection for texture replacement. Furthermore, the patent discloses a comparison of the color characteristics of the ROI with the other pixels in the frame and pixels with similar color characteristics that are classified into the same texture group. This invention Color provides characteristics based classifications, which leads to inaccurate results. This may affect the completeness of foreground object.

Another U.S. Pat. No. 8,503,767 assigned to Microsoft Corp. discloses a technology related to a texture region segmentation which is only applied to images. Though, the system segments distinctive features in the image. Still, the invention fails to provide its applications in other multimedia.

Another U.S. Pat. Np. 9,503,685 assigned to International Business Machines Corp. provides a solution to replace the background in video conference. Though, the invention is advancement to the prior inventions, still the patent lacks the capability to replace a specific portion of the background and instead replaces the whole background.

A research paper "Texture Replacement in Real Images" assigned to Yanghai Tsin discloses a technology for Texture replacement in real images, such as interior design, digital movie making and computer graphics. Furthermore, the paper discloses a system to replace some specified texture patterns in an image while preserving lighting effects, shadows and occlusions. Though the paper provides specific texture replacement in the background but still lacks the applicability of the texture replacement in any other multimedia.

The present invention seeks to provide an improvement in the field of texture replacement in a multimedia, more specifically, but not exclusively, in the field of deep neural learning texture recognition. Moreover, the invention proposes a semantic based distinctive textures and foreground selection using deep learning. The textures selected are replaced keeping the foreground region exclusive, which maintains the completeness of the foreground when applying texture replacement.

Therefore to overcome the shortcomings of the prior-arts, there is a need to provide an AI-based image processing system. The system is applied for texture region segmentation to images or videos. Moreover, the system uses texture motion tracker to track the movement of the selected texture and refine the region segmentation result from frame to frame. The motion tracking leads to a smoother segmentation result. And the replaced texture will also follow the motion of previous texture, which leads to more realistic looking results. In view of the foregoing inventions, there is a need in the art for a system to overcome or alleviate the before mentioned shortcomings of the prior arts.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced texture replacement system that recognizes textures in the background of the multimedia in real-time using a deep neural network for recognising.

SUMMARY OF THE INVENTION

A texture recognition and replacement system, the system recognizes multiple textures of a background of a multimedia. The system includes a few modules for recognizing the textures in the background and their replacement. The modules in the system are a segmentation module, a tracking module, a fusion module and a replacement module.

The segmentation module segments the multimedia to a background region with multiple textures and a foreground region. Moreover, the segmentation module compares the multiple textures with pre-defined textures to generate a number of identified textures. Furthermore, the segmentation module includes a portrait map unit and a texture map unit. The portrait map unit protects the foreground region. The texture map unit replaces the one or more identified textures with a texture template.

The tracking module includes a first tracker unit and a second tracker unit. The first tracker unit is for tracking feature matching of the number of identified textures to guide the texture template. Further, the second tracker unit is for tracking movement of the background region and the foreground region. Moreover, the movement of background region guides the movement of the texture template.

The fusion module adjusts color tone of the texture template based on the multimedia to generate a processed texture where the fusion module is a Generative adversarial networks module (GAN). Also the fusion module includes an encoder to encode the number of identified textures and the template texture to produce the processed texture and a decoder to decode the processed texture to the one or more identified textures.

Finally, the replacement module replaces the one or more textures with the processed texture. Also, the replacement module combines the processed texture with the foreground region to form a texture replaced multimedia.

Smart phones now days are embedded with more and more motion sensors for various applications. The benefits of the sensors are extended to texture recognition systems. The system is trained for identifying distinctive textures of the background region. The neural network is made robust to any setup of the multi-mode sensors, including lack of sensors on the devices. Ultimately, the feature vector extracted will take advantage of information beyond the still image or the video and produces an accurate texture replaced multimedia.

The primary objective of the invention is to provide deep learning to segment specific texture from images or video sequences, segmenting portrait or foreground which need to protected. The deep neuro network trains the system and assigns a number of pre-defined textures to the distinctive textures of the multimedia. Moreover, the deep neuro network utilizes the probability gating technique to predict the probability for a group of predefined texture by analyzing various factors The other objective of the invention is to provide a fusion module to automatically change the tone of the new texture template in consistency of the original multimedia.

Another objective of the invention is to provide a tracking module to track the movement of portrait or foreground region and to simulate the texture movement.

The yet another objective of the invention is to provide a replaced selected texture of the background of the multimedia with a post-processed texture template.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in sonic instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE DRAWINGS

Due to the limitation of lighting, cloud or other uncontrollable weather factor, a photographer may not get desired photo shoots. Therefore, a good photograph or video does not only reply on the skill of photographer but also relay on post production. Some digital imaging software are used by photographers to adjust image lighting, saturation, color tone, or manually add or change texture in images. Not only images relay on post production, videos also rely on texture replacement to generate fancy effects.

Manually label a specific texture can be tedious, especially for videos. It is thus appealing to automate the whole texture segment and labelling procedure. The goal of texture replacement is to replace some specified texture patterns without changing original lighting, shadows and occlusions.

Traditional methods including classifications based on color constancy, markov random field, and so on. All these methods consider the relationship between pixels but do not consider the semantic information of pixels which will lead to inaccurate segmentation result. For example, if a foreground object contains the similar color of background texture, the color classification methods will classify part of foreground as background texture.

The foreground object will be affected after texture replacement. Nowadays, AI technologies such as image segmentation are applied on texture replacement. Most of these methods only segment background area, which has low tolerance for error. If the background segmentation is inaccurate, the foreground object may be affected. Moreover, the texture replacement is usually based on copy paste, which leads to rough edges. In video application, the texture replacement usually does not consider the relationship from frame to frame, which leads to inconsistent texture replacement result. In this disclosure, we use AI model to segment specified texture, and use portrait or foreground mask to protect the portrait or foreground.

Moreover, we track the movement of texture and portrait of foreground and use this information to guide the movement of replaced texture. Also, we add a fusion module to adjust the color tone of replaced texture to be consistent with original texture. Related Works One way to solve the texture replacement problem is utilizing the machine learning models to find pattern with information with selected texture and Markov random field is used to model spatial lighting change constraints. Visually satisfactory result is achieved with this statistical method but deep learning methods like image segmentations are used to improve the texture segmentation results. U-net (encoder and decoder structure) are usually applied to provide deep learning solutions to background removal problem. Moreover, depth maps are also used to improve the quality of background masks.

Figure 1:
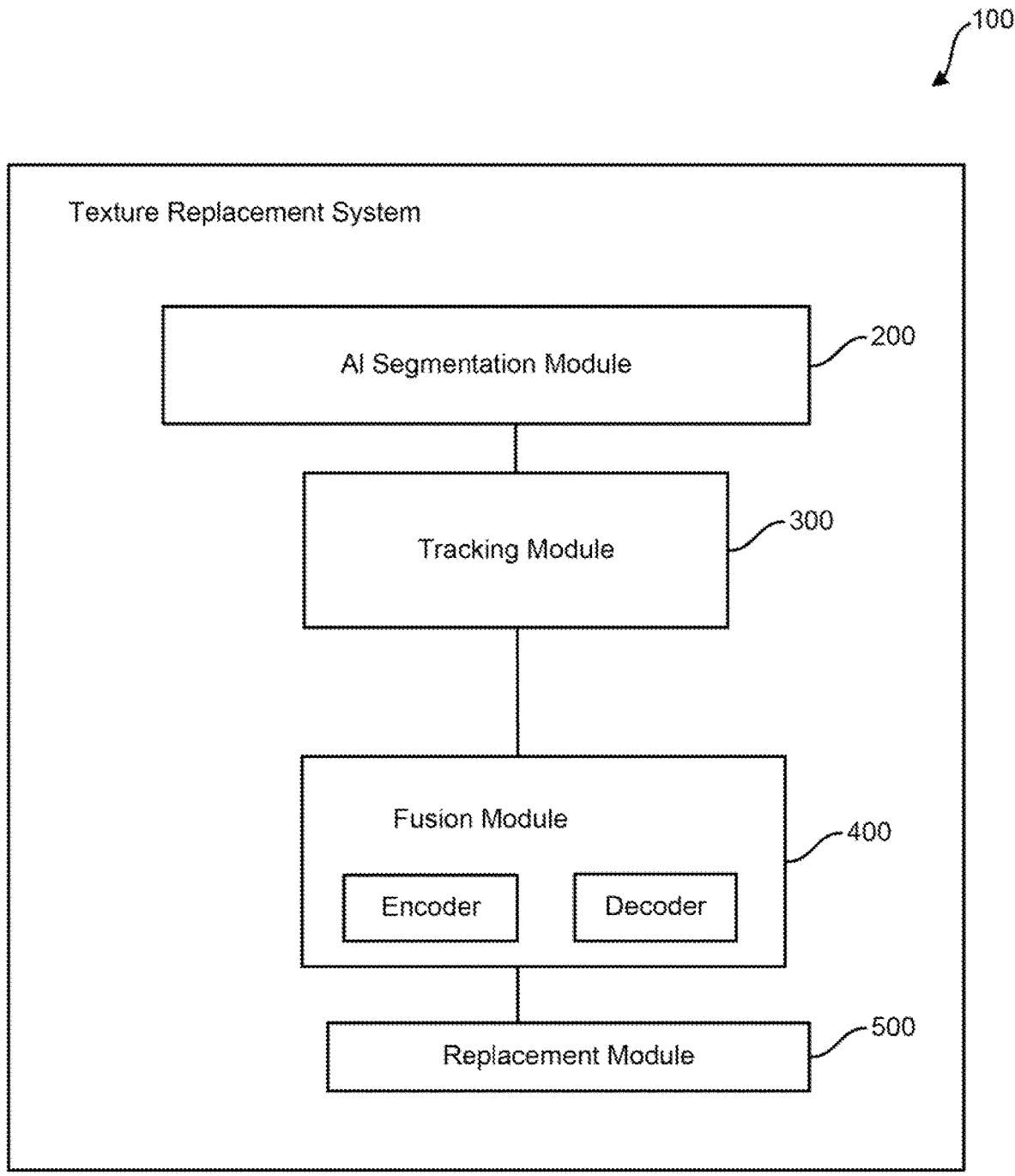
FIG. 1 illustrates a texture replacement system in accordance with the present invention.

FIG. 1 illustrates a texture recognition and replacement system 100. The system 100 recognizes the texture of a background of a multimedia. The system includes a few modules for recognizing, the textures in the background and their replacement. The modules in the system are a segmentation module 200, a tracking module 300, a fusion module 400 and a replacement module 500.

The segmentation module 200 segments the multimedia to a background region with multiple textures and a foreground region. Moreover, the segmentation module compares the multiple textures with pre-defined textures to generate a number of identified textures, further wherein the segmentation module 200 includes a portrait map unit and a texture map unit. The portrait map unit protect the foreground region. The texture map unit replaces the one or more identified textures with a texture template.

The tracking module 300 includes a first tracker unit and a second tracker unit. The first tracker unit is for tracking feature matching of the number of identified textures to guide the texture template. Further, the second tracker unit is for tracking movement of the background region and the foreground region, where the movement of background region guides the movement of the texture template.

The fusion module 400 adjusts color tone of the texture template based on the multimedia to generate a processed texture where the fusion module is a Generative adversarial networks module (GAN). Also the fusion module 400 includes an encoder to encode the number of identified textures and the template texture to produce the processed texture and a decoder to decode the processed texture to the one or more identified textures.

Finally, the replacement module 500 replaces the one or more textures with the processed texture. Also, the replacement module 500 combines the processed texture with the foreground region to form a texture replaced multimedia.

Figure 2A:
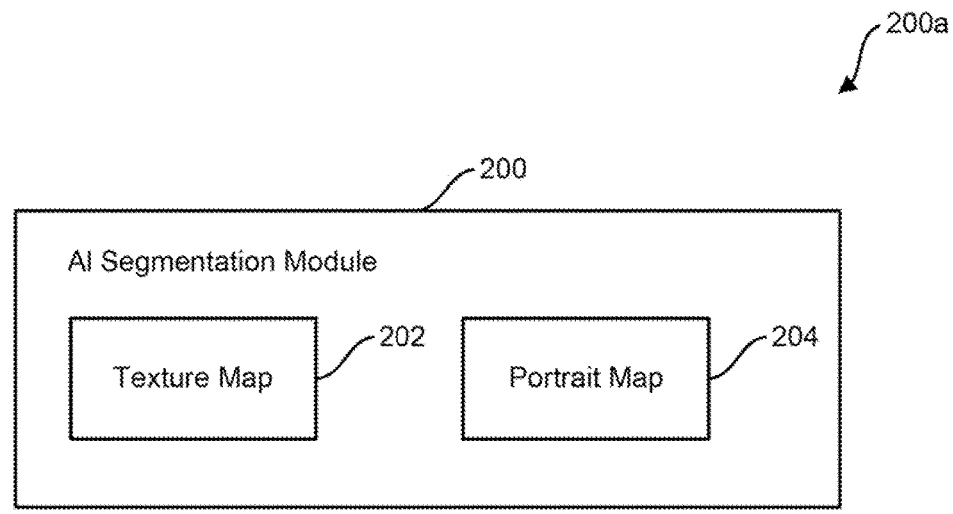
FIG. 2a illustrates a segmentation module within the texture replacement system.

FIG. 2A illustrates the segmentation module in the texture replacement system 200A, The Segmentation module 200 segments the multimedia to a background region with one or more textures and a foreground region, further wherein the segmentation module compares the one or more textures with pre-defined textures to generate one or more identified textures. The segmentation module further includes a portrait map unit 204 and a texture map unit 202. The portrait map unit 204 protect the foreground region by covering the foreground region with a foreground mask. The texture map unit 202 replaces the one or more identified textures with a texture template.

The segmentation module 200 uses artificial intelligence and machine learning algorithm to segment the background section and the foreground section. Moreover, the segmentation module 200 uses artificial intelligence and machine learning algorithm for comparing the one or more textures with pre-defined textures to generate one or more identified textures.

The feature matching of the one or more identified textures is based on an optical flow algorithm, where the optical flow algorithm determines pattern of apparent motion of objects, surfaces, and edges in the multimedia. The feature matching of the one or more identified textures is based on feature mapping algorithm including SIFT etc.

Figure 2B:
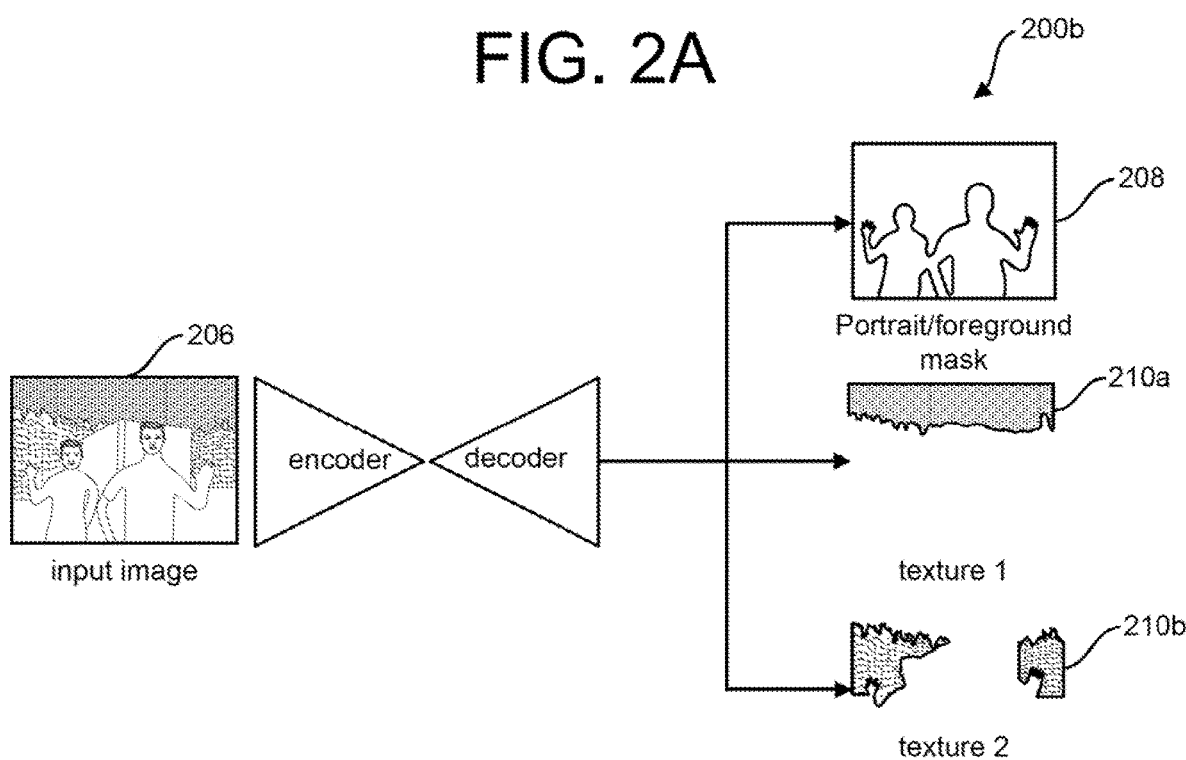
FIG. 2b illustrates the segmentation module in accordance with the present invention.

FIG. 2B illustrates architecture of the segmentation module 200B. The segmentation module includes the application of Deep learning for the training of texture maps and portrait or foreground map. The segmentation module is applied on an input image 206 where a foreground mask is applied to hide or protect the foreground region 208 and multiple textures (210a, 210b) of the background. The AI is used to predefine a few textures that we interested in, for example, sky, wall, water. The user selects one or more textures to replace from the multiple textures (210a, 210b). The texture is referred as texture A (210a). The map for texture A (210a) is used as a guide to replace texture A (210a) with a selected texture template B.

The portrait or foreground map is used to protect portrait or foreground region, The replaced area should be exclusive with the portrait or foreground map. As shown in FIG. 2B, the proposed neuro network segment pixels of image into foreground subject region or mask, predefined texture and unknown texture. In proposed system, foreground objects could be human, cat, dog, buildings and so on. Background texture could be sky, water, trees and so on.

Figure 3A:
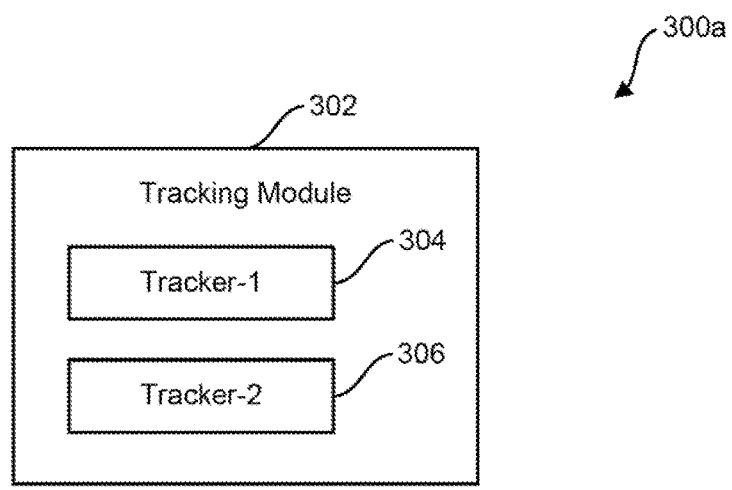
FIG. 3a illustrates a tracking module within the texture replacement system.

FIG. 3A illustrates the tracking module in the texture replacement system 300A. The tracking module 300 includes a first tracker unit 304 and a second tracker unit 306. The first tracker unit 304 for tracking feature matching of the one or more identified textures to guide the texture template. The second tracker unit 306 is for tracking movement of the background region and the foreground region. The movement of the background region guides the movement of the texture template Primarily, the first type of tracking module is based on image feature mapping algorithm, such as optical flow, SIFT feature matching.

Alternatively, the first type of tracking module is based on image feature matching, such as Harris Corner, SURF (Speeded Up Robust Feature), FAST(Features from Accelerated Segment Test) or ORB(Oriented FAST and Rotated BRIEF).

The second type of tracking module is based on motion sensor of device such as gyro sensor and accelerator sensor.

Ideally, after detecting interest point we go on to compute a descriptor for every one of them. Descriptors can be categorized into two classes: Local Descriptor: It is a compact representation of a point's local neighbourhood. Local descriptors try to resemble shape and appearance only in a local neighbourhood around a point and thus are very suitable for representing it in terms of matching. Global Descriptor: A global descriptor describes the whole image. They are generally not very robust as a change in part of the image may cause it to fail as it will affect the resulting descriptor.

Figure 3B:
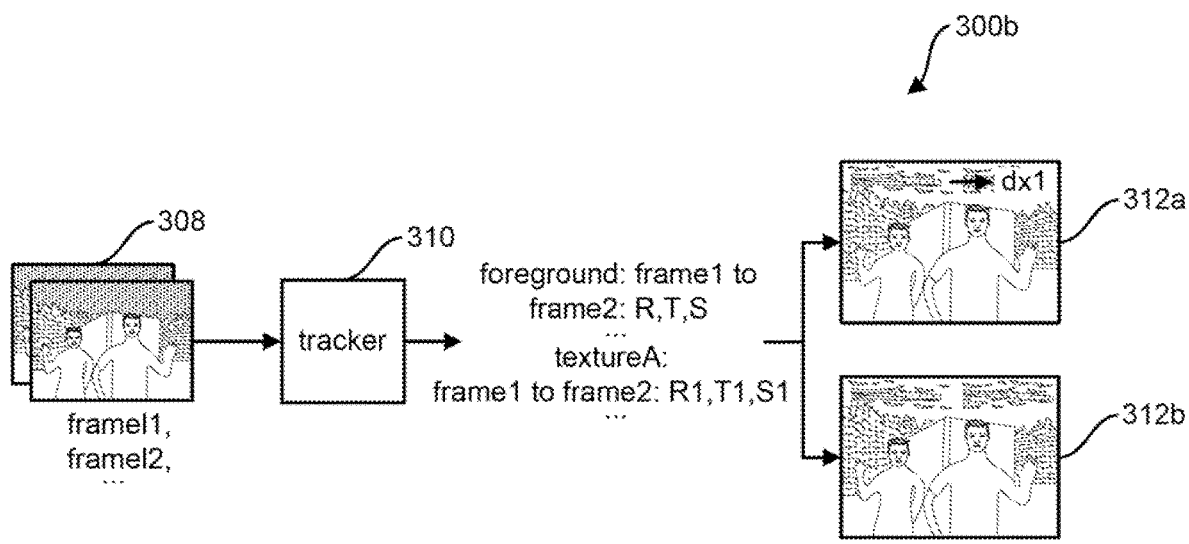
FIG. 3b illustrates the tracking module in accordance with the present invention.

FIG. 3B illustrates architecture of the tracking module 300B, The tracking module 300 is for video texture replacement. The first type of tracking module is based on image feature mapping by a tracker 310 for different frames on the image 308, such as optical flow, SIFT feature mapping etc. The second type of tracking module is based on motion sensor of device such as gyro sensor and accelerator sensor. The motion is formulated into rotation, translation and scaling.

Two types of tracking module (312a, 312b) could be used independently or combined. It will predict the movement of background texture and foreground object. The movement of foreground will be used to refine the mask of portrait or foreground and the movement of background texture A will guide the movement of template texture B. These create links between nearby frames, which makes the video smoother and less shaky.

Figure 4A:
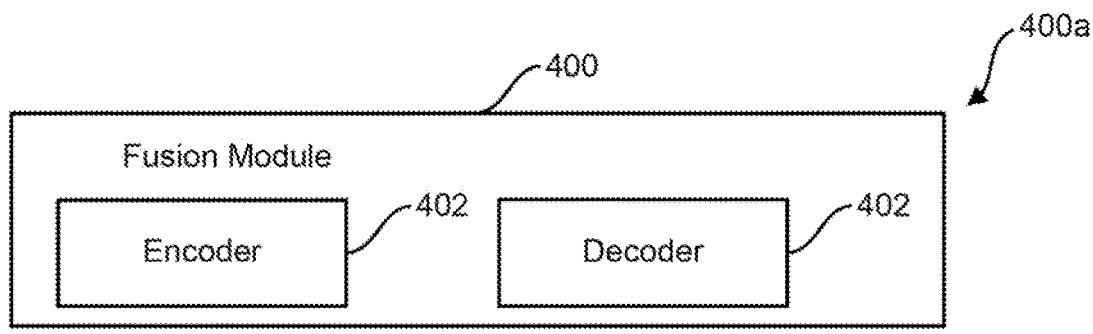
FIG. 4a illustrates a fusion module in the texture replacement system.

FIG. 4A illustrates the fusion module in the texture replacement system 400A. The fusion module 400 adjusts color tone of the texture template based on the multimedia to generate a processed texture. The fusion module 400 encodes the selected texture as a feature code and uses this code as a guide to transfer the texture template to the domain of selected texture forming a processed texture.

The fusion module is based on a Generative adversarial networks (GAN) model. The GAN model keeps the consistency of luminous, color temperature, hue and so on in consideration for fusion. The loss of GAN model includes 3 component. VAE loss, GAN loss and Cycle consistency loss. The VAE loss controls the reconstruction from latent code to input urines and from images to latent code. The GAN loss controls the accuracy of the discriminator. The cycle consistency loss makes sure the image convert from domain A to domain B can be converted hack.

The fusion module 400 includes an encoder 402 for encoding the one or more identified textures and the template texture to produce the processed texture and a decoder 404 for decoding the processed texture to the one or more identified textures.

Figure 4B:
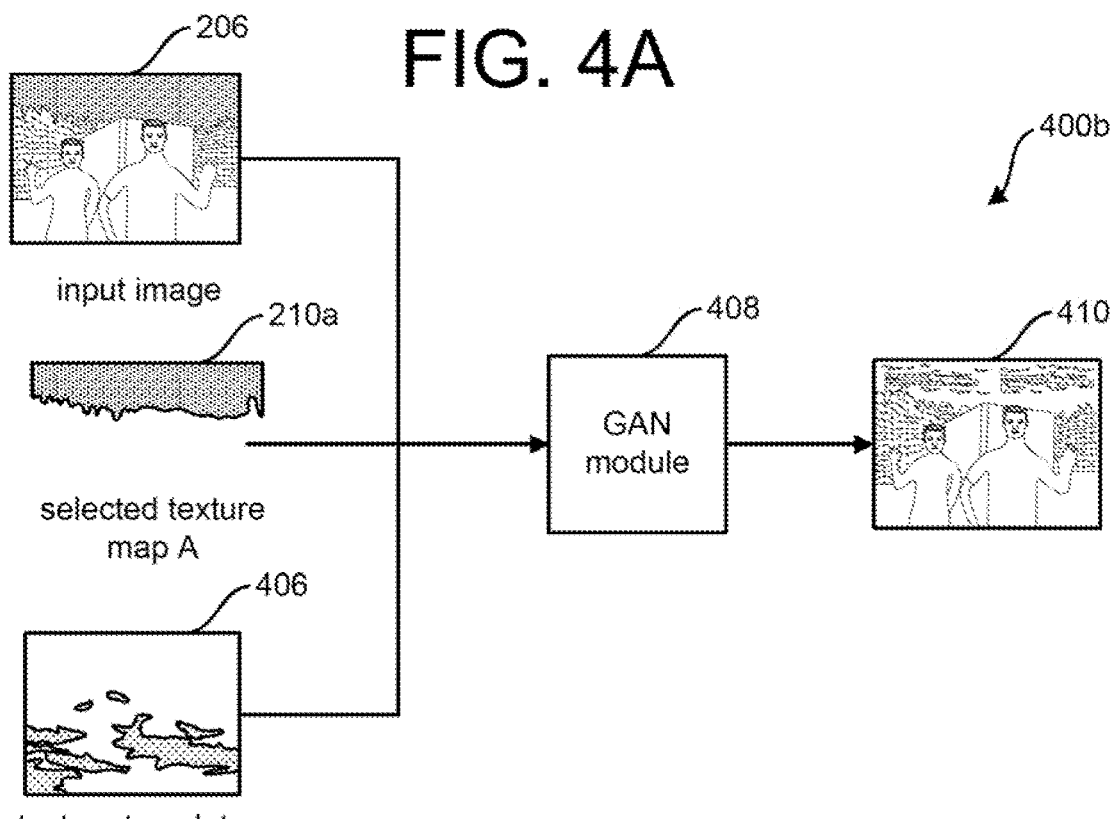
FIG. 4b illustrates the fusion module in accordance with the present invention.

FIG. 4B illustrates architecture of the fusion module 400B. Fusion module generates consistent color tone of the original input image 206 and texture B. This fusion model can be GAN model 408 with original texture A 210a and texture template B 406 are input. The output will be an adjusted texture B. For example, the fusion model takes the texture A 206 in the original images and the template B 210a as input. The fusion module will encode texture A as a feature code and use this code as a guide to transfer texture template B to the domain of texture A for creating output 410. The loss of GAN model 408 includes 3 component, VAE loss, GAN loss and Cycle consistency loss.

or

The VAE loss controls the reconstruction from latent code to input images and from images to latent code.

or

The GAN loss controls the accuracy of the discriminator.

or

The cycle consistency loss makes sure the image convex (from domain A to domain B can be convert back.

Figure 5:
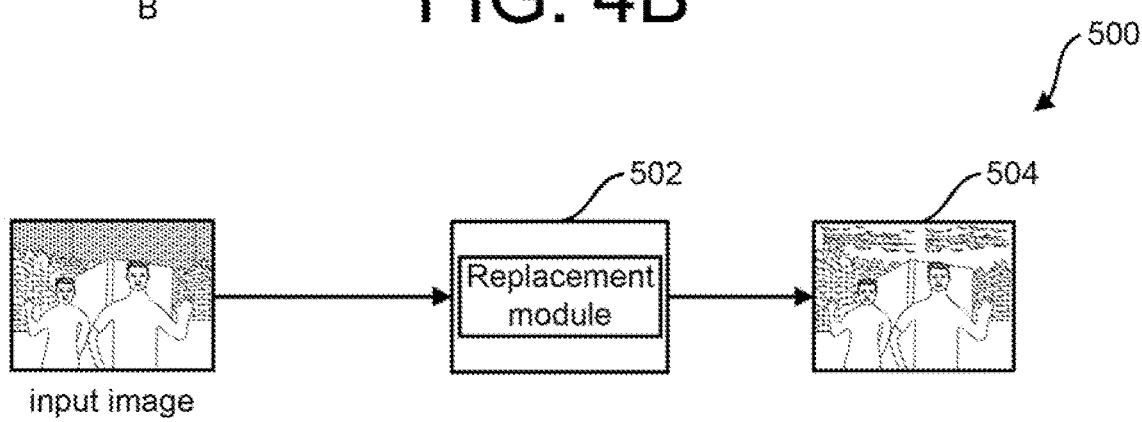
FIG. 5 illustrates a replacement module in the texture replacement system.

FIG. 5 illustrates the architecture of the replacement module 500. The replacement module 500 replaces the one or more textures with the processed texture. The replacement module includes a merger 502 to combine the processed texture with the foreground region to form a texture replaced multimedia 504.

Figure 6:
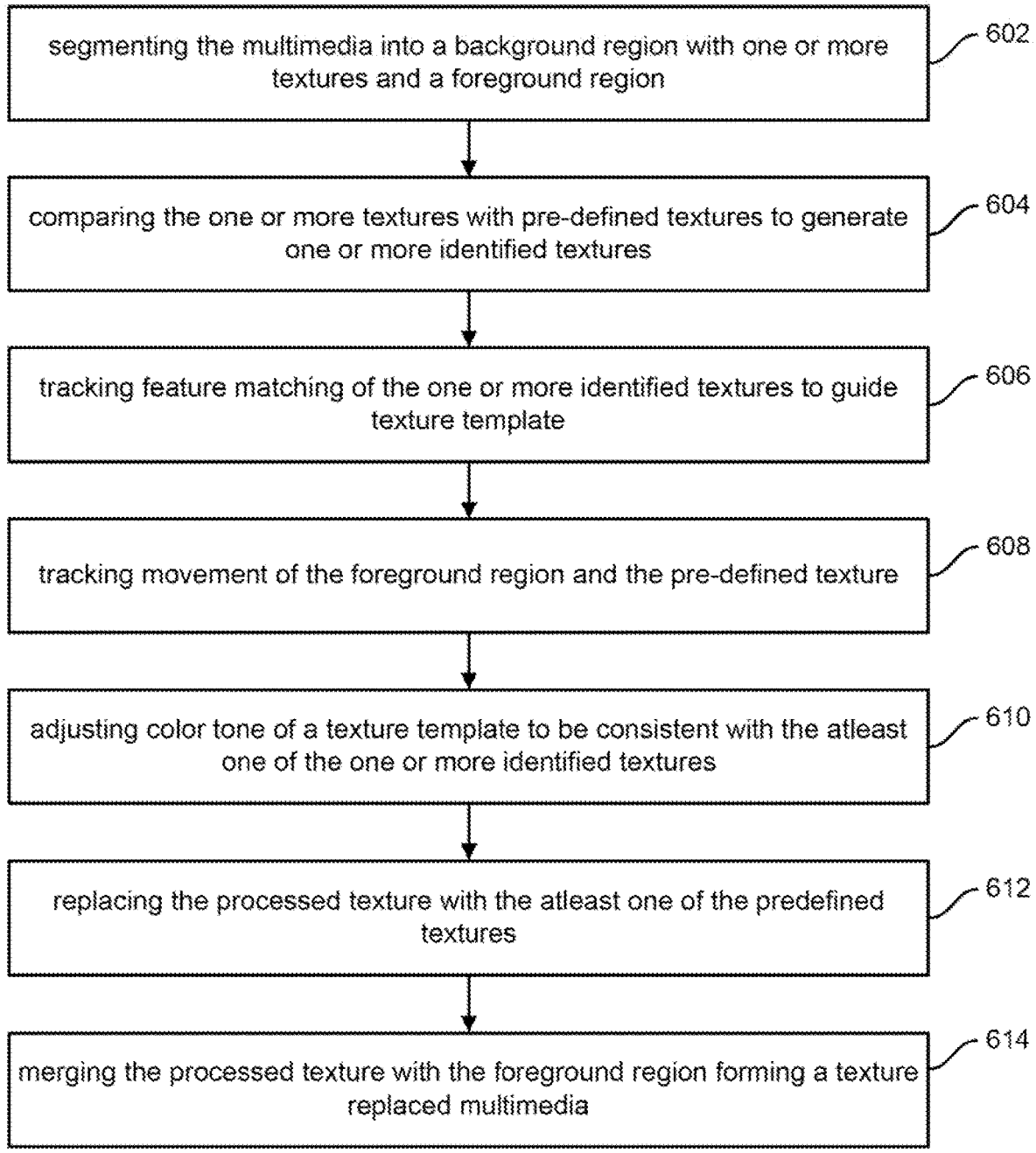
FIG. 6 illustrates a method for replacing the texture in a multimedia.
Figure 7:
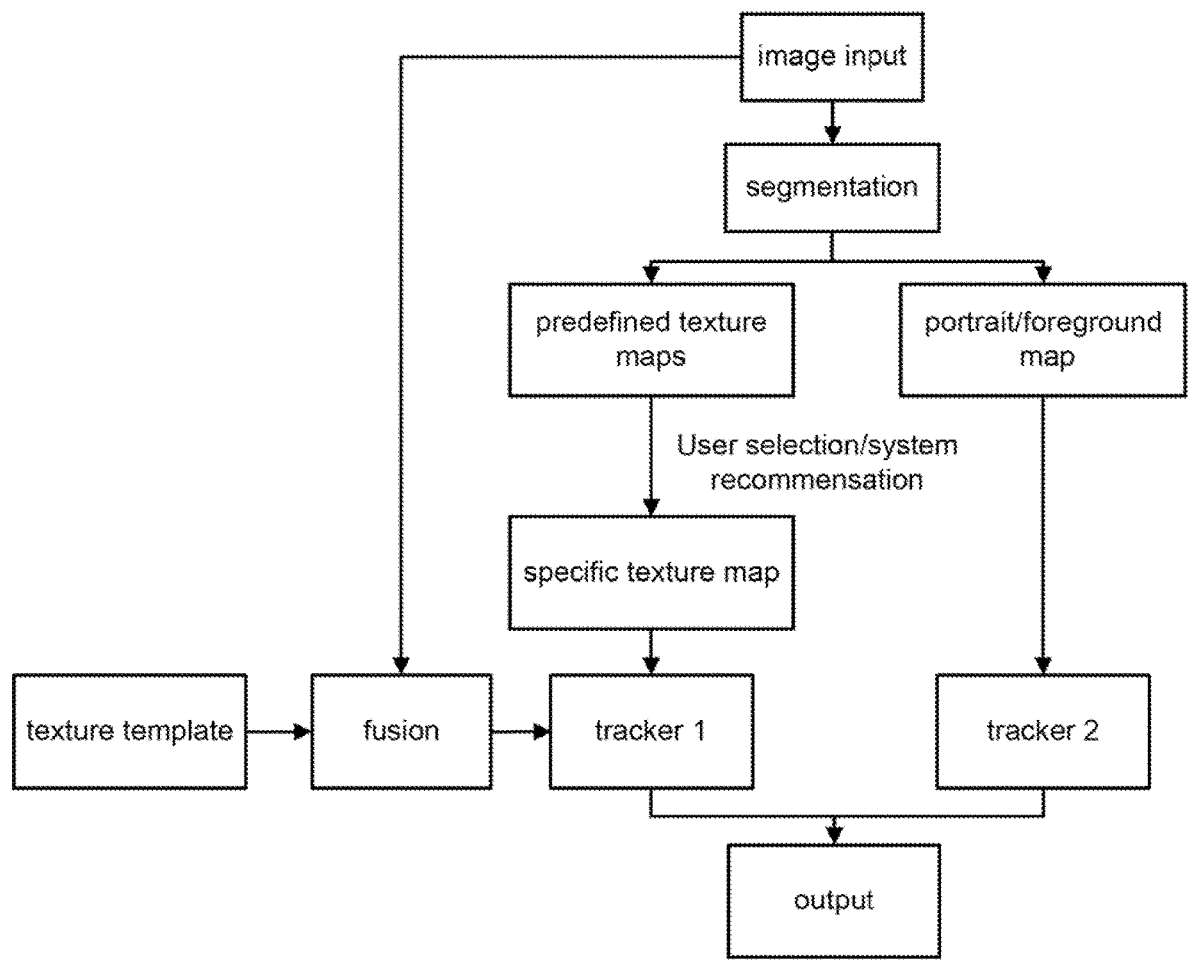

FIG. 6 illustrates a method for replacing the texture of a multimedia. The method includes the following steps. Firstly, once the multimedia is received by the computing device segmenting one or more textures from a background region and a foreground region 602. In segmentation, the one or more textures are compared with plurality of pre-defined texture and generate one or more identified textures 604. The segmentation is followed with tracking feature matching of the one or more identified textures to guide texture template 606. Tracking the movement of the foreground and the pre-defined texture 608, where a tracking module simulates texture movement. Then adjusting color tone of a texture template 610 to be consistent with the at least one of the one or more identified textures. The texture template is retrieved for a texture selected by user from the one or more identified textures to form a processed texture. Followed with replacing the processed texture with the selected texture 612 and finally merging the processed texture with the foreground region forming a texture replaced multimedia 614.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for texture replacement in a multimedia, comprising:
    a segmentation module, wherein the segmentation module segments the multimedia to a background region with one or more textures and a foreground region, and compares the one or more textures with pre-defined textures to generate one or more identified textures, further wherein the segmentation module comprising:
        a portrait map unit, wherein the portrait: map unit protects the foreground region; and
        a texture map unit, wherein the texture map unit replaces the one or more identified textures with a texture template;
    a tracking module, wherein the tracking module comprising:
        a first tracker unit, wherein the first tracker unit tracks feature matching of the one or more identified textures to guide the texture template; and
        a second tracker unit, wherein the second tracker unit tracks movement of the background region and the foreground region, wherein the movement of background region guides a movement of the texture template;
    a fusion module, wherein the fusion module adjusts color tone of the texture template based on the multimedia to generate a processed texture; and
    a replacement module, wherein the replacement module replaces the one or more textures with the processed texture, and combines the processed texture with the foreground region to form a texture replaced multimedia.

2. The system of claim 1, wherein the system is configured with an electronic device.

3. The system of claim 2, wherein the electronic device is a smart phone, a tablet or a camera.

4. The system of claim 2, wherein the pre-defined textures are stored in a memory of the electronic device.

5. The system of claim 1, wherein the multimedia is either of an image, a video, an animation.

6. The system of claim 1, wherein the segmentation module uses artificial intelligence and machine learning algorithm to segment the background section and the foreground section.

7. The system of claim 6, wherein the segmentation module uses artificial intelligence and machine learning algorithm for comparing the one or more textures with pre-defined textures to generate one or more identified textures.

8. The system of claim 1, wherein the portrait map unit protects the foreground region by using a portrait mask.

9. The system of claim 1, wherein the feature matching of the one or more identified textures is based on an optical flow algorithm.

10. The system of claim 9, wherein the optical flow algorithm determines pattern of apparent motion of objects, surfaces, and edges in the multimedia.

11. The system of claim 1, wherein the feature matching of the one or more identified textures is based on a feature mapping algorithm.

12. The system of claim 11, wherein the feature mapping algorithm determines pattern of changing scale, intensity, and rotation.

13. The system of claim 2, wherein guiding the movement of the texture template is based on sensing the movement by a motion sensor of the electronic device.

14. The system of claim 13, wherein the motion sensor is an accelerometer or a Gyro-meter.

15. The system of claim 13, wherein the motion is either of a rotation motion, a translation motion and a scaling motion.

16. The system of claim 1, wherein the fusion module is based on a Generative adversarial networks (GAN) model.

17. The system of claim 1, wherein the fusion module comprises an encoder for encoding the one or more identified textures and the template texture to produce the processed texture.

18. The system of claim 1, wherein the fusion module comprises a decoder for decoding the processed texture to the one or more identified textures.

19. A method for replacing a texture in a multimedia, wherein the method comprising: segmenting one or more textures from a background region and a foreground region, wherein the one or more textures are compared with a plurality of pre-defined textures to generate one or more identified textures;

tracking movement of the foreground region and the pre-defined textures for simulating the texture movement;

adjusting color tone of a texture template to be consistent with at least one of the one or more identified textures, wherein the texture template is retrieved for a texture selected by user from the one or more identified textures to form a processed texture;

replacing the processed texture with the selected texture; and merging the processed texture with the foreground region forming a texture replaced multimedia.

\* \* \* \* \*